United States Patent Office 3,424,037
Patented Jan. 28, 1969

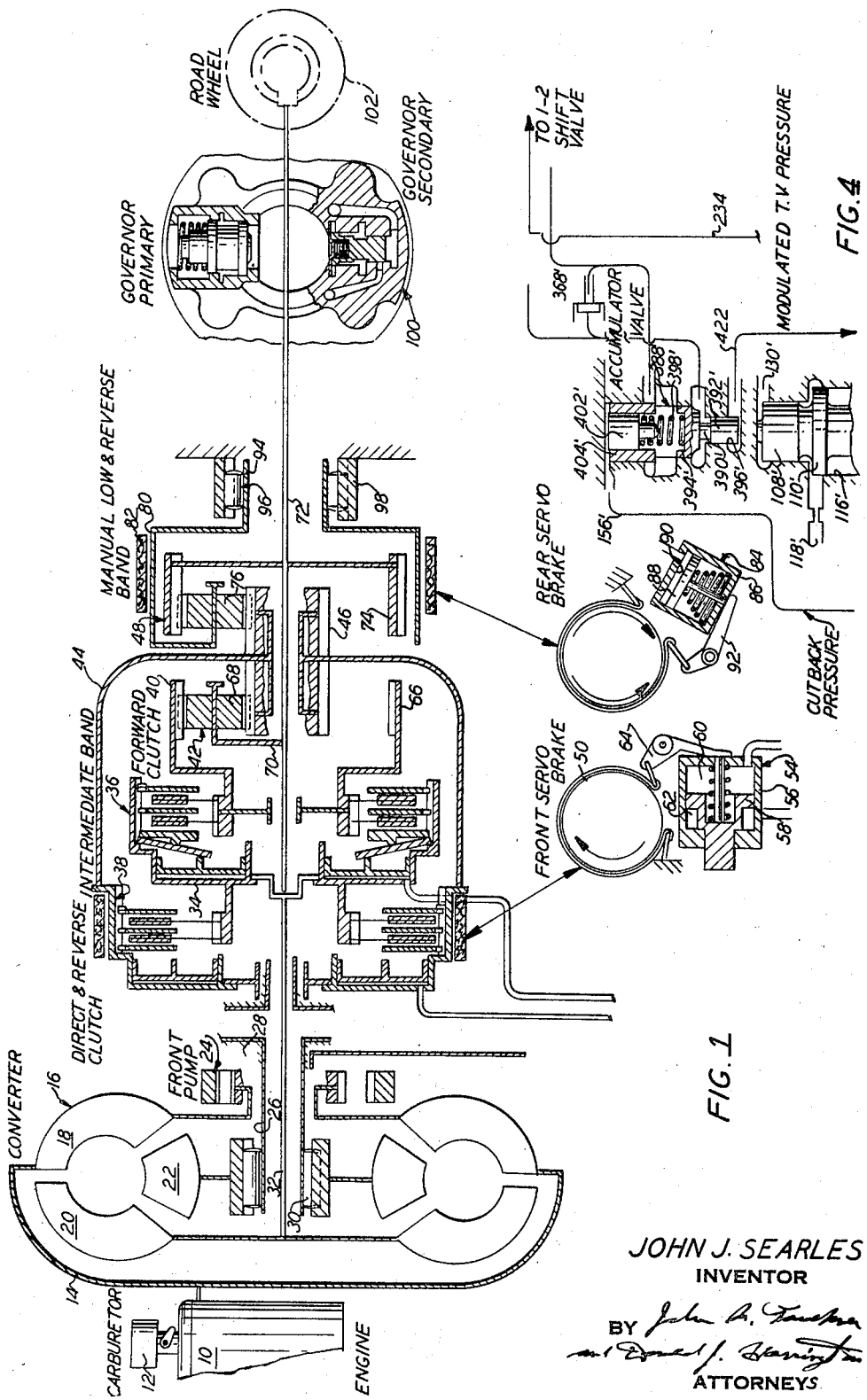

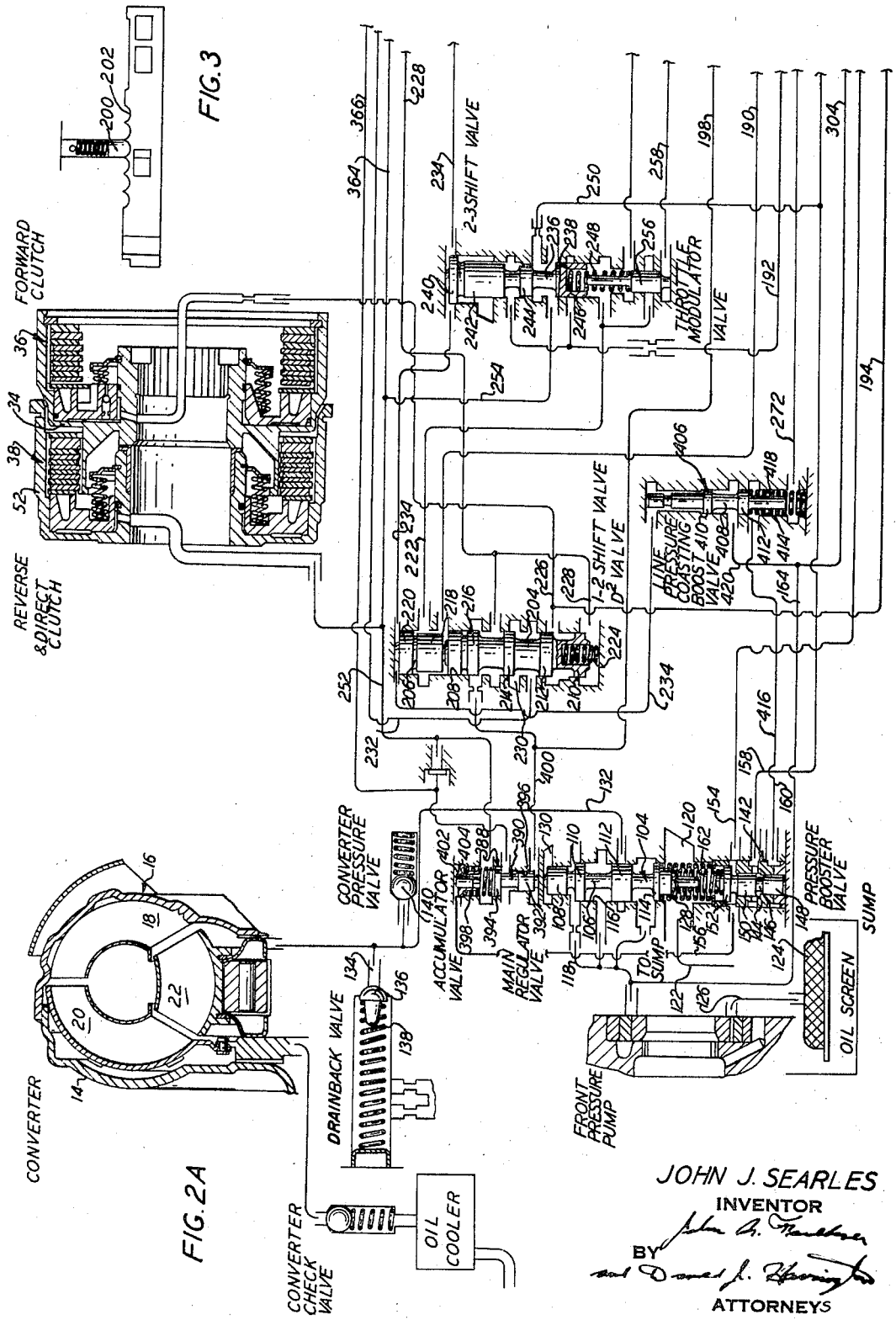

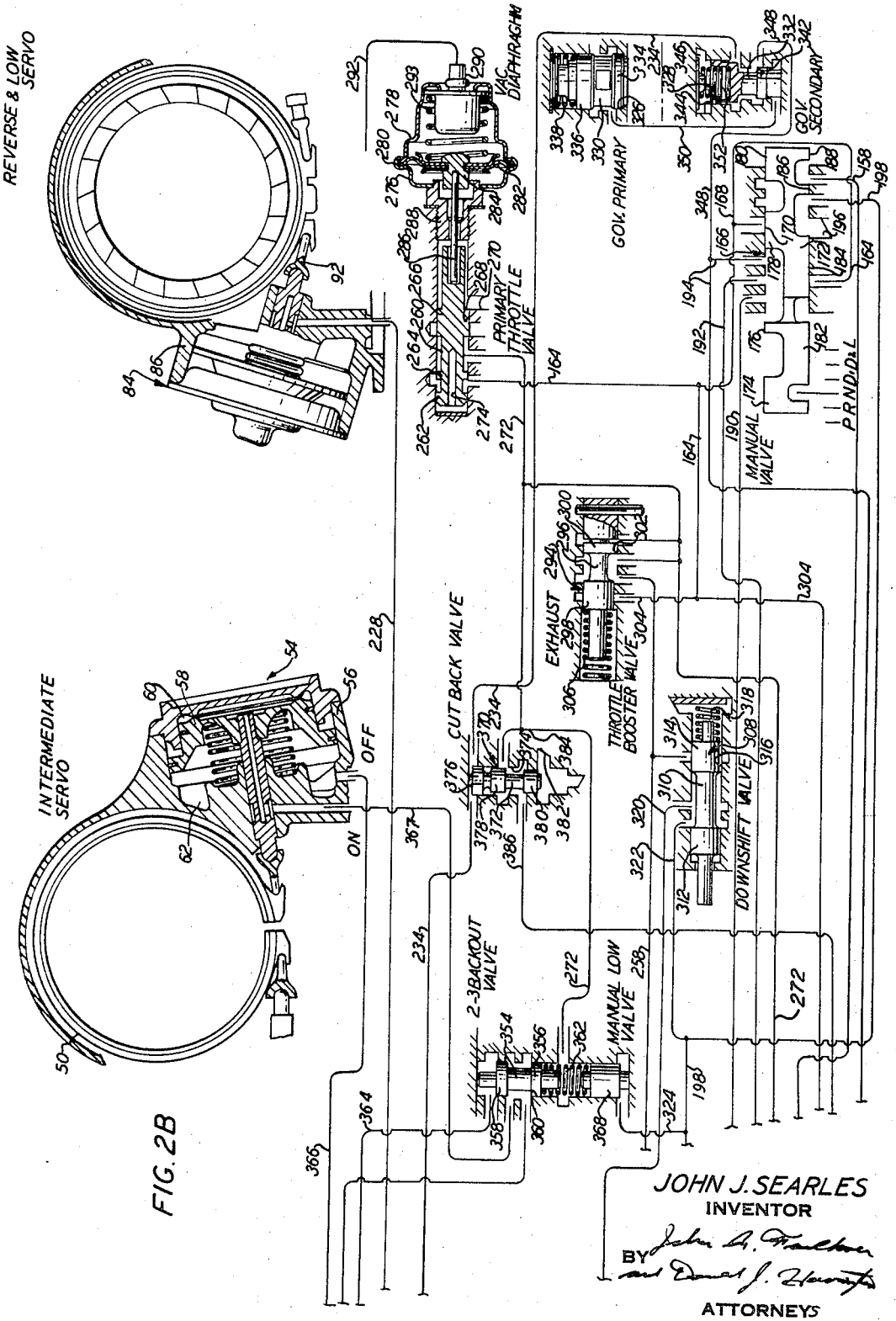

3,424,037
MULTIPLE DRIVE RANGE CONTROL VALVE SYSTEM FOR AN AUTOMATIC TRANSMISSION
John J. Searles, Northville, Mich., assignor to Ford Motor Company, Dearborn, Mich., a corporation of Delaware
Original application Oct. 5, 1964, Ser. No. 401,356, now Patent No. 3,344,681, dated Oct. 3, 1967. Divided and this application Oct. 2, 1967, Ser. No. 672,240
U.S. Cl. 74—869　　　　　　　　　　　　　6 Claims
Int. Cl. G05b 13/00; F16f 3/74

ABSTRACT OF THE DISCLOSURE

This specification describes a valve system that is adapted to control ratio changes in a geared power transmission mechanism for use in an automotive vehicle driveline. It includes a driver-operated ratio selector valve in fluid communication with fluid pressure distributor valves which control pressure distribution to ratio controlling servos. The valve system may be conditioned for continuous, single-ratio operation when the manual selector valve assumes one operating position, or for single-ratio operation in a different underdrive ratio when the manual selector valve assumes a second operating position, or for operation with automatic ratio changes when the selector valve is moved to a third operating position. Ratio changes are accomplished in response to changes in operating pressure signals that are proportional in magnitude to vehicle speed and driving torque.

Reference to related applications

This disclosure relates to improvements in the structure disclosed in copending application Ser. No. 397,798 (now Patent No. 3,327,554). It is a division of application Ser. No. 401,356, filed Oct. 5, 1964 (now Patent No. 3,344,681). Both of these copending applications are assigned to the assignee of the invention of this disclosure.

Brief summary of the invention

The torque delivery elements of the power transmission mechanism of this disclosure include planetary gear elements, the relative motion of which is controlled by fluid pressure operated clutch and brake servos. The driving portion of the gearing of which the planetary gear units form a part is connected to the turbine of a hydrokinetic torque converter mechanism. The impeller of the torque converter mechanism is drivably connected in the usual fashion to the crankshaft of an internal combustion engine in an automotive vehicle driveline. The control system of my instant invention includes a fluid pump that is drivably connected to torque delivery members of the mechanism. Suitable conduit structure is provided for hydraulically connecting the servos to the pressure source. This conduit structure is defined in part by fluid pressure distributor valves that selectively distribute pressure to the various servos to condition the mechanism for operation in a speed ratio that is consistent with the torqe transmitting requirements of the driveline.

The system includes also a source of a pressure signal that is proportional in magnitude to the engine intake manifold pressure. This in general is an indication of engine torque. There is provided also a source of a pressure signal that is proportional in magnitude to the driven speed of the driven member of the driveline. The pressure distributor valves are adapted to respond to changes in the magnitudes of the signals to distribute control pressure to each of the servos to initiate speed ratio changes.

The magnitude of the pressure that is made available to the servos is regulated by a regulator valve system that responds to changes in the operating torque demand to vary the pressure level so that it is maintained at all times at a value that is sufficient to establish adequate torque transmitting capacity of the clutches and brakes that are actuated by the servos. The regulator valve system is adapted also to maintain an operating pressure level that will contribute to optimum shift quality. Smooth speed ratio changes are achieved and the shift points occur at the proper instant to satisfy varying performance requirements of the driveline.

The provision of a control system of the type above set forth being a principal object of my invention, it is another object of my invention to provide such an automatic control valve system wherein provision is made for personally overruling the automatic pressure distributing function of the distributor valves when it is desired to obtain a downshift from a high speed ratio to a lower speed ratio. I contemplate that this downshift may occur as a driver operated downshift valve is shifted to a pressure distributing position where it is capable of transferring an engine manifold pressure sensitive signal to an auxiliary area on the pressure distributor valves thereby changing the effective value of the actuating forces upon them. This is in contrast to certain prior art arrangements that utilize the regulated line pressure of a main fluid pressure source rather than a pressure signal that is sensitive to engine torque or torque demand. In such conventional systems the pressure signal that is distributed from the pressure source to the distributor valves during a forced downshift often is of a different magnitude at low vehicle speeds than at higher vehicle speeds. This is due to the fact that the valve tolerance of the regulator valve system creates a back pressure at high speeds that is not present during operation at lower speeds. At high speeds the fluid flow that must be accommodated by the regulator valve system is higher since the pressure source is in the form of a positive displacement pump.

It is a further object of my invention to provide a valve system of the type above set forth wherein provision is made for obtaining two distinct drive ranges that can be selected by the vehicle operator. In one drive range automatic speed ratio changes from an underdrive ratio to a direct drive ratio occur during acceleration from a standing start. During operation in the other drive range the vehicle may be accelerated from a standing start with a low speed ratio in the driveline, and a first upshift occurs to an intermediate underdrive ratio. This is followed by a second upshift to the direct drive ratio. Selection of one drive range or the other is made by a driver controlled manual selector valve.

In the control system of the Leonard et al. application Ser. No. 277,855, now Patent No. 3,295,387, pressure is distributed to an intermediate brake servo when the manual valve is shifted to one drive range position, and that same pressure is distributed simultaneously to the forward drive clutch servo. An automatic speed ratio change then occurs as the intermediate brake servo is released and the direct drive servo is applied while the forward clutch remains applied. If the manual valve is adjusted to the other drive range position, however, pressure is distributed initially only to the forward drive clutch while an overrunning reaction brake accommodates the torque reaction of the gearing. If the manual valve or the linkage that is used to control it is maladjusted, it is possible that pressure will be distributed across the lands of the manual valve to cause an undesirable pressure distribution to the intermediate servo when the transmission mechanism is operating in the lowest speed ratio. Partial engagement of the intermediate brake due to the application of pressure to the intermediate servo causes premature failure of the friction elements of the intermediate brake and possibly other torque transmitting elements of the system as well. It is an object of my invention to overcome this shortcoming by incorporating in the system a bipartite fluid pressure distributor valve that is adapted to respond to such a pressure buildup due to leakage across the valve lands of the manual valve element. If such a pressure buildup occurs, the pressure distributor valve will shift to an upshift position thereby immediately conditioning the transmission mechanism for operation in the intermediate drive range.

It is a further object of my invention to provide a valve system having an accumulator feature that cushions the application of the intermediate brake servo during a forced downshift from the high speed ratio to the intermediate speed ratio or during an upshift from the lowest speed ratio to the intermediate speed ratio. In this way the shift quality is substantially improved regardless of the particular performance requirements that may exist when the shift is initiated.

It is a further object of my invention to provide a control valve system having the accumulator feature set forth in the foregoing object and wherein provision is made for modifying the accumulator action during application of the intermediate brake when the pressure regulator valve system is conditioned for maintaining an increased line pressure.

It is another object of my invention to provide a valve system having the accumulator feature above set forth wherein provision is made also for modifying the effective accumulator action to provide a reduced accumulator effect when ratio shifts to the intermediate ratio are made with the engine manifold pressure at a high value.

It is a further object of my invention to provide a valve system having the accumulator feature set forth in the foregoing objects and wherein provision is made for rendering the accumulator action insensitive to changes in ambient pressure due to changes in altitude.

These and other objects and features of my invention will become apparent from the following description and from the accompanying drawings, wherein:

FIGURE 1 shows in schematic form the torque delivery elements of a power transmission mechanism in an automotive vehicle driveline;

FIGURE 2A shows in schematic form a portion of an automatic control valve system for the structure of FIGURE 1;

FIGURE 2B shows another portion of the control valve system for the structure of FIGURE 1;

FIGURE 3 shows a detail view of the manual valve element which forms a part of the control system of FIGURES 2A and 2B; and FIGURE 4 shows a modified accumulator valve that corresponds to the accumulator valvce of FIGURE 2A.

Referring first to FIGURE 1, numeral 10 designates an internal combustion engine in an automotive vehicle driveline. It includes a carburetor 12 which forms a part of an air-fuel mixture engine intake manifold system. The engine crankshaft for engine 10 is drivably connected to an impeller drive shell 14 for a hydrokinetic torque converter unit 16. This unit includes a bladed impeller 18, a bladed turbine 20 and a bladed stator 22. The impeller, the turbine and the stator are situated in toroidal fluid flow relationship in the usual fashion.

A positive displacement pump 24 is connected drivably to the bladed impeller 18. It forms a part of the control valve system of FIGURES 2A and 2B, as will be explained subsequently.

Stator 22 is supported by a stationary stator sleeve shaft 26 which is connected to a stationary transmission housing shown in part at 28. An overrunning brake 30 for the stator 22 includes overrunning coupling elements between the shaft 26 and the stator 22 which permit freewheeling motion of the stator 22 in the direction of rotation of the impeller 18 although rotation of the stator 22 in the opposite direction is prevented.

The turbine 20 is connected drivably to a central turbine shaft 32. Shaft 32 is connected directly to a clutch element 34 which is common to a forward drive friction disc clutch 36 and a reverse and direct friction clutch 38. Clutch 36, which is actuated by means of a fluid pressure operated servo, functions to connect selectively the element 34 to ring gear 40 of a first simple planetary gear unit 42. Clutch 38 also is actuated by a fluid pressure operated servo as indicated. It functions to connect drivably, when it is engaged, element 34 to a drive shell 44. This shell in turn is connected to a common sun gear 46 for planetary gear unit 42 and a second simple planetary gear unit 48.

An intermediate speed ratio friction brake band 50 surrounds the clutch drum 52 of the reverse and direct clutch 38. Drum 52 is connected to the drive shell 44. Brake band 50 is applied and released by means of a front intermediate brake servo 54, which includes a cylinder 56 and a cooperating piston 58. Cylinder 56 and piston 58 cooperate to define a pair of opposed fluid pressure chambers—namely, a brake release chamber 60 and a brake apply chamber 62. The control valve system of FIGURES 2A and 2B functions to distribute selectively brake actuating pressure to each chamber. The piston is connected to the brake band 50 by means of an operator in the form of a linkage 64.

Planetary gear unit 42 includes a ring gear 66, planet pinions 68 and a carrier 70 upon which the pinions 68 are journaled. Pinions 68 mesh with ring gear 66 and with sun gear 46. Carrier 70 is connected drivably to a power output shaft 72.

Planetary gear unit 48 includes a ring gear 74, planet pinions 76 and a carrier 78, the latter journaling the pinions 76. Ring gear 74 and sun gear 46 are in mesh with pinions 76. Power output shaft 72 is connected drivably to the ring gear 74.

Carrier 78 is connected to a brake drum 80 around which is positioned a reverse and low brake band 82. This brake band may be applied during reverse drive operation and during operation in the manual low drive range by means of a fluid pressure operated reverse and low servo 84. This servo includes a cylinder 86 and a piston 88 which cooperate to define a fluid pressure chamber 90. This chamber can be supplied with pressure selectively by means of the circuit illustrated in FIGURES 2A and 2B.

The piston 88 is connected to the free end of the brake band 82 by means of a suitable operator in the form of a linkage 92. Brake drum 80 is connected to the inner race 94 of an overrunning reaction brake 96. The outer race of the brake 96 is connected to a portion of the transmission housing as shown at 98. Brake 96 includes overrunning brake elements that anchor the carrier 78 against rotation in one direction to accommodate reaction torque, but freewheeling motion in the opposite direction is permitted. The brake 96 is effective during operation in the lowest speed ratio to accommodate driving torque reaction.

A compound governor valve assembly 100 is connected drivably to the power output shaft 72. It functions in a manner subsequently to be described to provide a pressure signal that is an indicator of the driven speed of the shaft 72. Shaft 72 is connected to vehicle traction wheels 102 through a suitable drive shaft and differential mechanism.

To condition the mechanism for operation in the lowest speed ratio, it merely is necessary to apply the forward clutch 36. This clutch remains applied during operation in any forward driving speed ratio. Torque then is delivered from the turbine 20 and through the clutch 36 to the ring gear 40. Since the carrier 70 is connected to the power output shaft 72, and since it resists movement, sun gear 46 tends to be driven in a reverse direction. A positive driving torque, however, is applied to the carrier 70, which is transmitted directly to the shaft 72. The reverse motion of the sun gear 46 causes ring gear 74 to be driven in a forward driving direction as the carrier 78 acts as a reaction member. Carrier 78 is inhibited from rotation in the direction of rotation of the sun gear 46 by the overrunning brake 96. Brake 96 therefore acts as a reaction point for the gear system.

The positive driving torque thus transmitted to the ring gear 74 is transmitted directly to the power output shaft 72. Thus, a split torque delivery path is provided through the gearing during low speed ratio operation.

To condition the mechanism for intermediate underdrive operation, brake band 50 is applied by pressurizing fluid pressure chamber 62 of the brake servo 54. This anchors sun gear 46 so that it can function as a reaction member. Turbine torque then is distributed through shaft 32 and through the engaged clutch 36 to the ring gear 40. Sun gear 46 accommodates reaction torque as the carrier 70 is driven in a forward driving direction. This, of course, drives power output shaft 72 at an increased speed ratio as the overrunning brake 96 overruns. Thus a transition from the lowest speed ratio to the intermediate speed ratio is accomplished by engaging only one friction torque establishing device—namely, the brake band 50.

To establish a high speed ratio condition, brake band 50 is released in synchronism with the application of the reverse and direct clutch 38. Clutch 36, of course, remains applied as explained previously. Thus the sun gear 46 becomes locked to the ring gear 40 and the elements of the gearing rotate in unison to establish a 1:1 speed ratio.

Continuous operation in the low speed range can be obtained by engaging brake band 82. This anchors the carrier 78. The forward clutch 36, of course, remains applied. Turbine torque is distributed, as described previously, to the ring gear 40 as a split torque delivery path is established in the gearing. The control system can be conditioned so that upshifts to the higher speed ratios will be inhibited.

Reverse drive operation is obtained by releasing clutch 36 and applying clutch 38. Brake band 82 is applied. Turbine torque then is distributed directly to the drive shell 44 through the apply clutch 38. This drives the sun gear 46 in the direction of rotation of the turbine. Since carrier 78 is anchored, ring gear 48 and the power output shaft 72 are driven in a reverse direction at a reduced speed ratio.

During an upshift from a lower speed ratio to the intermediate speed ratio, fluid pressure is admitted to the brake servo chamber 62. Upon a subsequent upshift from the intermediate speed ratio to the high speed ratio, pressure is distributed simultaneously to chambers 62 and 60 of the intermediate front brake servo 54 to release the brake 50. Upon a subsequent downshift from the high speed ratio to the intermediate speed ratio, it merely is necessary to exhaust chamber 60 as the cltuch 38 is released. The residual pressure in chamber 62 then will apply the servo 54. The control system for obtaining automatic speed ratio changes in the torque transmitting structure of FIGURE 1 is illustrated in FIGURES 2A, 2B and 3. An alternate embodiment of the control system is illustrated in part in FIGURE 4.

In FIGURE 2A there is shown a main pressure regulator valve 104 which is provided for the purpose of regulating the discharge pressure of the front pump 24. It includes a multiple land valve spool 106 which has formed thereon spaced valve lands 108, 110, 112 and 114. Valve spool 106 is slidably situated within a valve chamber 116, which has formed therein internal valve lands that register with the lands 108, 110, 112 and 114. Lands 108 and 110 are formed with a differential diameter to define an annular area which is in fluid communication with a passage 118, which communicates with the discharge side of the front pump 24. This passage also communicates with chamber 116 at a location intermediate lands 110 and 112. The portion of the chamber 116 intermediate lands 112 and 114 also is in fluid communication with passage 118 as indicated.

An exhaust port 120 is formed in chamber 116 at a location directly adjacent land 114. This port is in fluid communication with a flow return line 122 which communicates with the transmission sump that is defined by the lower region of the transmission housing, not shown. An oil screen 124 also is situated within this transmission sump and any fluid in the sump that is delivered to the front pump passes through the screen. The front pump supply passage is shown at 126.

Spool 106 of the main regulator valve assembly 104 is biased in an upward direction by a valve spring 128. The upper end of the chamber 116 is exhausted through an exhaust port 130.

A converter feed line 132 communicates with the chamber 116 at a location directly adjacent land 112. A transmission lubrication oil system shown in part at 134 communicates with passage 132. A one-way drainback valve 136 is situated in passage 134 and is biased by a spring 138 to a closed position. A pressure of approximately 5 p.s.i. will unseat the valve 136 thereby permitting distribution of lubricating oil to the lubricating system after the torque converter 16 is filled. A maximum converter pressure relief valve 140 communicates with passage 132 to prevent an excessive pressure buildup.

Located at the lower end of the valve chamber 116 is a pressure booster valve assembly 142. It includes a valve sleeve 144 having a valve cavity within which is slidably positioned a pressure booster valve spool 146. This spool is formed with three spaced valve lands 148, 150 and and 152 which slidably register with cooperating internal valve lands formed in the sleeve 144. The lands 150 and 152 define a differential area that is in fluid communication with ports in sleeve 144 which in turn communicate with a passage 154. This passage extends to the cutback valve as will be expained subsequently. The differential area of lands 150 and 152 communicates also with a passage 156 which in turn extends to the intermediate band accumulator valve as will be described subsequently.

Lands 148 and 150 also define a differential area which is in fluid communication with a port in sleeve 144 that in turn is hydraulically connected to a passage 158. The lower surface of the land 148 communicates with another passage 160 through other ports in sleeve 144.

A valve spring 162 is situated between spool 146 and spool 106 during operation in certain operating zones. The regulating characteristics of the main regulator valve 104 then are determined in part by the calibration of both of the springs 128 and 162.

Passage 158 is pressurized, as will be explained subsequently, during operation of the transmission mechanism in the reverse drive range. This provides a fluid pressure force that supplements the valve spring force to cause an increased operating pressure level that is maintained by the main regulator valve 104 during reverse drive operation. This increases the servo capacity for the reverse and low servo 84, as well as the reverse and direct clutch 38, to permit the transfer of reverse driving torque without slippage of the friction elements. Passage 160 on the other hand is pressurized during operation of the transmission mechanism under coasting conditions at high vehicle speeds. An appropriate line pressure signal is made available to passage 160 by a line pressure coasting boost valve under these conditions, as will be explained subsequently. During operation of the mechanism under all other conditions, passage 160 is supplied with a throttle pressure signal that is sensitive to the engine intake manifold pressure of the internal combustion engine with which my improved transmission mechanism and control system is adapted to be used. This also will be explained subsequently.

In each instance when the passage 160 is pressurized, a fluid pressure force acting on the lower end of land 148 is created and this causes an increase in the regulated pressure level that is maintained by the regulator valve 104. Passage 154 is pressurized by the cutback valve during operation of the transmision mechanism at low vehicle speeds for any given engine throttle position. This pressure then causes a temporary increase in the regulated line pressure maintained by the valve 104 as the transmission accelerates from a standing start. After the speed ratio increases, however, the cutback valve will exhaust passage 154, and this will be accompanied immediately by a reduction in the regulated pressure of valve 104. The cutback in the regulated pressure that is accompanied by a venting of the passage 154 occurs as the torque converter approaches a coupling condition and at a time prior to the automatic speed ratio changes in the gearing.

As the engine is started, pressure develops in passage 18. This pressure acts on the differential area of lands 108 and 110 and urges valve spool 106 against the opposing force of the regulator valve springs. Land 112 progressively uncovers passage 132 leading to the converter torus circuit. This occurs prior to the time that land 114 uncovers exhaust port 120.

After the converter pressure reaches a calibrated value, land 114 brings passage 118 into fluid communication with exhaust port 120. This port communicates with the transmission sump through low pressure passage 122.

The magnitude of the pressure level maintained in passage 118 depends upon the calibration of springs 128 and 162 for any given valve spool design. This regulated pressure level can be modified, however, by the fluid pressure forces exerted on the pressure booster valve.

Passage 118 communicates with the main line pressure passage 164, which extends to manual valve 166. A branch passage 168 extends from passage 164 to the manual valve at a location spaced from the point at which passage 164 communicates with the manual valve.

The manual valve comprises a valve chamber 170 within which is positioned a multiple land valve element 172. The lands for element 172 are shown at 174, 176, 178 and 180, each of the lands being situated on one side only of the element 172. Other lands 182, 184, 186 and 188 are formed on the element 172 at a location that is displaced 180° with respect to the location of lands 174 through 180.

The manual valve element 172 can be shifted to any one of several operating positions. These are identified by the symbols R, N, D2, D1 and L, which respectively identify the reverse position, neutral position, second drive range position, first drive range position and low drive range position. When the element 172 assumes the position shown, passages 164 and 168 are blocked by land 184 and land 170, respectively.

An auxiliary passage 190 extends from the manual valve chamber 170 to the 1–2 shift valve assembly, which will be described subsequently. Passage 192 communicates with the manual valve chamber 170 at a location directly adjacent passage 190. Passage 194 communicates with valve chamber 170 at a point directly adjacent passage 192. The space between lands 178 and 176, when the manual valve element 172 assumes the position shown in FIGURE 2B, establishes fluid communication between passages 190, 192 and 194. This space also is in fluid communication through the manual valve element 172 with the space between land 182 and land 184.

An exhaust port 196 communicates with the valve chamber 170 at a location adjacent land 184. Passage 158 which extends to the pressure booster valve as explained previously communicates with the chamber 170 at a location adjacent the right-hand end thereof. The passage 198 communicates with the chamber 172 at a location intermediate exhaust port 196 and passage 158.

If the manual valve element 172 is shifted to the reverse drive position R, passages 190, 192 and 194 are exhausted through the left-hand end of the chamber 170. Passage 164 is blocked by land 184. Passage 168, which receives pressure from the main line pressure passage 164, is in fluid communication with passage 198 which extends to the reverse and low servo 84 through the 1–2 shift valve assembly as will be explained subsequently. Passage 158, which extends to the pressure booster valve and to the reverse clutch 38, is in fluid communication with passage 198 through a space intermediate lands 186 and 188.

If the manual valve element 172 is shifted to the D2 position, the transmission mechanism will be conditioned for acceeration from a standing start in the intermediate speed ratio. A subsequent upshift may occur, as will be expained subsequently, in response to movement of the 2–3 shift valve. Passage 190 is brought into fluid communication with passage 164 through the valve element 172 and is pressurized. This causes the 1–2 shift valve element to assume an upshift position. Pressure then is distributed under these conditions from passage 164 and through the valve element 172 to the passage 194, which is in fluid communication with the forward clutch servo 34 and the apply side 62 of the intermediate brake servo 54. Passage 192 is pressurized in the same fashion so that pressure may be distributed to the 2–3 shift valve thus conditioning it for subsequent upshift to the direct drive ratio. Passages 198 and 158 both are exhausted through the exhaust port 196.

If the manual valve element 172 is shifted to the D1 position, the transmission is conditioned for acceleration from a standing start in the lowest speed ratio and two subsequent upshifts then will be available. Under these conditions passage 190 is exhausted through the left-hand side of the manual valve chamber 170. Passages 198 and 158 remain exhausted although they are exhausted through the right-hand end of the manual valve chamber 170 rather than through the exhaust port 196. Thus the only change in the pressure distribution during movement of the manual valve element 172 from the D2 position to the D1 position occurs as passage 190 becomes exhausted.

If the manual valve element 172 is shifted to the L position, the transmission will be conditioned for continuous operation in the lowest speed ratio as the vehicle accelerates from a standing start. No upshifts will be available. If the shift is made while the vehicle is under motion at a speed greater than a calibrated minimum value, however, a downshift will occur to the intermediate speed ratio and the transmission will operate continuously in that ratio until the vehicle speed falls below the predetermined value. At that time a downshift to the lowest speed ratio will occur and the transmission thereafter will be locked in the lowest speed ratio and no upshifts can occur subsequently.

When the manual valve assumes the L position, passages 190 and 192 are exhausted through the left-hand end of the manual valve chamber 170. Passage 164 is blocked by land 182. Passage 194 is pressurized as it is brought into communication with passage 168 by means of the space between lands 176 and 178. Exhaust port 196 is blocked by land 184 and passage 198 is brought into fluid communication with passage 168. Passage 158 is exhausted through the right-hand end of the valve chamber 170.

The various operating positions of the manual valve element 174 are determined by a spring loaded detent mechanism that comprises a plunger 200 located in the valve body in a cooperating bore. Plunger 200 has a rounded nose that engages detent recesses 202 formed in the valve element 172. Each recess 202 corresponds to one of the operating positions described in the foregoing paragraphs.

A 1–2 shift valve assembly is shown in FIGURE 2A. It comprises two separate valve elements 204 and 206 which are positioned within a common valve chamber 208. Valve element 204 comprises spaced annular valve lands 210, 212, 214 and 216. Valve element 206 comprises two valve lands of differential diameter, as shown at 218 and 220. The annular area defined by the differential diameter valve lands 218 and 220 is in fluid communication with a modulated throttle pressure passage 222 which is pressurized with a modulated pressure signal that is proportional in magnitude to engine intake manifold pressure as will be explained subsequently. The portion of the chamber 208 intermediate the lands 218 and 216 is in fluid communication with passage 190. If the manual valve happens to be maladjusted, or if the driver controlled linkage mechanism for adjusting the valve element 172 is maladjusted, it may be possible for passages 192 and 190 to become pressurized simultaneously. For example, if it is desired to operate in the D1 range and the valve element 172 assumes, due to miscalibration or maladjustment, a position intermediate the D1 and D2 positions, it is possible for passage 190 to become pressurized. Under these conditions a pressure buildup would occur on the top of valve land 216 thereby forcing the valve element 204 to assume an upshift position so that the transmission will operate in the intermediate drive range. By connecting passages 190 and 222 through valve chamber 208, partial application of the intermediate servo during operation in the D1 range thus is avoided. This is a safety feature that prevents inadvertent simultaneous operation of the transmission mechanism in the D1 range and the D2 range as the vehicle accelerates from a standing start.

Valve elements 204 and 206 are biased in an upward direction, as viewed in FIGURE 2A, by a valve spring 224. Valve element 210 is formed with a slightly smaller diameter than the passage 228 through the valve chamber 208. Thus the reverse and low servo 84 becomes applied. As an upshift occurs, land 216 blocks passage 198 and passage 228 becomes exhausted through port 230 as explained previously.

Automatic upshifts from the intermediate drive ratio to the direct drive high speed ratio are controlled by the 2–3 shift valve assembly which comprises a multiple land valve spool 236 which is situated slidably within a valve chamber 238. It includes a valve land 240, a valve land 242, a valve land 244 and a valve land 246. Valve spool 236 is urged in an upward direction by a valve spring 248. Governor pressure acts upon the upper end of land 240 and is distributed thereto through governor pressure passage 234. Passage 192, which is pressurized during operation in either the D1 or D2 ranges, is in fluid communication with chamber 238 at a location intermediate lands 242 and 244. Land 242 is slightly larger than land 244 and a pressure force acting in an upward direction thus is established when the valve element 236 assumes the position shown. When the valve element 236 is moved downwardly, however, the area defined by these differential diameter valve lands is brought into fluid communication with passage 250 which is exhausted through passage 158. Thus movement of the valve element 236 in a downward direction is accompanied by a snap action due to the change in the balanced forces that act upon it. In this respect the movement of the 2–3 shift valve element is similar to the movement of the 1–2 shift valve element 204 where the differential diameter valve lands 212 and 210 are pressurized in the low speed ratio position but exhausted in the intermediate speed ratio position. Movement of the valve element 204 also is accompanied by a snap action. This produces a hysteresis effect which eliminates hunting of the shift valve elements. Following movement of the valve elements to the upshift positions, a corresponding downshift does not occur until the vehicle speed reaches a value that is less than the value at which the upshift occurs for any given engine intake manifold pressure.

The reverse and direct drive clutch 38 is exhausted through the 2–3 shift valve element when the latter assumes the position shown in FIGURE 2A. The exhaust flow path for the reverse and direct clutch is established by passage 252, which communicates directly with the direct drive clutch servo, passage 254 and passage 250, the latter being connected directly to the exhausted passage 158. When the valve element 236 assumes a downward position, however, passage 254 is brought into communication with passage 192 thereby causing pressure distribution to the reverse and direct drive servo.

Modulated throttle pressure passage 222 communicates with the lower end of the valve land 246 to supplement the action of the spring 248. This passage 222 receives its pressure from the throttle modulator valve which includes a single diameter valve element 256 situated in the lower region of the valve chamber 238. Spring 248 is disposed between element 256 and the element 236. The output signal of the throttle booster valve 294 is distributed through a passage 258 to the lower end of the element 256. This pressure in passage 258 is related in magnitude to the engine intake manifold pressure. At a manifold pressure less than a predetermined value the signal in passage 258 is not sufficient to overcome the opposing force of spring 248. At any manifold pressure in excess of that value, however, the spring pressure of spring 248 is overcome thereby permitting a reduced or modulated pressure to enter passage 222. Thus the minimum throttle upshift points are established independently of manifold pressure. The shift points depend only upon the calibration of the springs for the shift valves and upon the governor pressure force acting upon the shift valves. When a shift occurs under advanced throttle operating conditions, the valve elements 236 and 204 move in response to the forces established by the governor pressure signal and the manifold pressure responsive signal.

As shown in FIGURE 2B, the manifold pressure sensitive signal is produced by the primary throttle valve and vacuum diaphragm assembly illustrated in FIGURE 2B. The primary throttle valve comprises a valve spool 260 having formed thereon spaced valve lands 262, 264 and 266. These lands slidably cooperate with internal valve lands formed in a throttle valve chamber 268. Line pressure passage 164 communicates with chamber 268 at a location adjacent land 264. An exhaust port 270 communicates with the chamber 268 at a location adjacent land 266. A primary throttle pressure passage 272 communicates with the chamber 268 at a location intermediate exhaust port 270 and line pressure passage 164. The pressure in passage 272 is transferred to the left-hand end of the element 260 and acts against the face of land 262, a suitable internal passage 274 being provided for this purpose.

The vacuum diaphragm comprises a diaphragm housing 276 and a diaphragm housing 278. They are secured together by crimping as shown at 280. A flexible diaphragm 282 is secured at its margin to the housings 276 and 278 at the juncture 280. A diaphragm element 284 secured to the central region of the diaphragm 282 carries diaphragm backup discs on either side of the diaphragm 282 as indicated. A valve operating stem 286 is situated between the member 284 and the valve element 260.

Housing 276 is secured to a threaded member 288 which is threadably received within the valve body. The housing 278 and the diaphragm 282 define a pressure cavity which is in fluid communication with a fitting 290. This fitting provides a connection with an intake manifold pressure passage 292.

A spring 293 is siutated between the diaphragm 282 and the end of the housing 278 and urges the diaphragm 282 in a left-hand direction. Atmospheric pressure exists on the left-hand side of diaphragm 282. Thus when a manifold vacuum exists in the engine intake manifold system, the spring 293 and the differential pressures acting upon the diaphragm 282 create a balanced condition. Upon an increase in manifold pressure, the valve element 260 will tend to be urged in a left-hand direction. The converse is true upon a decrease in manifold pressure.

The valve element 260 modulates the pressure in passage 164 and produces a resultant signal in passage 272 that is an indicator of the magnitude of the manifold pressure in the chamber on the right-hand side of the diaphragm 282.

The signal in passage 272 is distributed to the throttle booster valve 294. This valve includes a valve element 296 which has formed thereon spaced valve lands 298 and 300. Land 300 is formed with a larger diameter than land 298.

Element 296 is slidably situated within a valve chamber 302 which is formed with internal valve lands that register with lands 298 and 300. Passage 272 communicates with chamber 302 on either side of the land 300.

Main line pressure passage 164 communicates with the valve chamber 302 through a passage 304, the degree of communication being controlled by land 298. Passage 258 which is the throttle booster valve output passage, communicates with the chamber 302 at a location intermediate passage 304 and passage 272. Valve element 296 is urged in a right-hand direction as view in FIGURE 2B by a valve spring 306.

When the engine intake manifold pressure is less than a predetermined high vacuum value, valve element 296 assumes the position shown. The throttle pressure in passage 272 under these conditions is insufficent to cause the element 296 to shift in a left-hand direction. Thus passage 272 communicates directly with passage 258, and the throttle modulator valve then is subjected directly to the output signal of the primary throttle valve. When the magnitude of the engine intake manifold pressure exceeds a calibrated value (low vacuum), however, the spring 306 yields thereby permitting controlled communication between passage 258 and 304. At the same time the degree of communication between passage 258 and passage 272 becomes reduced. Thus the line pressure in passage 304 is used to augment the signal in passage 272 to produce a magnified output signal in passage 258 at advanced engine carburetor throttle settings and low vacuum. The magnitude of the signal in passage 258 then is made to correspond more closely to actual engine torque demand of the operator. Normally the engine intake manifold pressure changes only slightly upon a change in engine throttle position once the engine throttle setting has exceeded a median value. A torque demand downshift then would be difficult to achieve at advanced engine throttle settings if it were not for the fact that the throttle booster valve functions during operation at advanced engine throttle settings to boost the output signal of the primary throttle valve. The calibration of the primary throttle valve and the throttle booster valve thus determine the shift points for any given governor pressure.

The automatic controlling functions of the 1–2 shift valve and the 2–3 shift valve can be overruled by the downshift valve 308. This valve comprises a valve element 310 having spaced valve lands 312 and 314 which register with internal valve lands formed in the downshift valve chamber 316. Valve element 310 is urged in a left-hand direction by valve spring 318. Passage 258 communicates with chamber 316 at a location directly adjacent land 314. It normally is blocked by land 314 when the engine carburetor throttle setting is at any value other than a position that corresponds to a point beyond the wide open throttle position. The valve element 310 is connected mechanically to the engine carburetor throttle with a lost motion linkage. It is insensitive to engine carburetor throttle valve movement except in those instances when the carburetor throttle valve is moved beyond the wide open throttle setting. Thus whenever the engine carburetor throttle setting is at a position less than that which would cause a shifting movement of the element 310, passage 320 is exhausted through passage 322, the latter communicating with passage 198. Exhausted passage 198 communicates with passage 324.

Passages 320 and 322 communicate with the chamber 316 at a location intermediate lands 312 and 314.

When a forced downshift is desired, the operator advances the engine carburetor throttle to its maximum setting. At this time the effective pressure signal in passage 258 is at a maximum. Thus when element 310 is shifted in a right-hand direction, communication is established between passages 258 and 320 so that the maximum signal of the throttle booster valve is distributed to passage 320 and to the 2–3 shift valve assembly. This signal supplements the action of the spring 248 to urge the spool 236 in an upward direction. The same signal is distributed to the differential area defined by the lands 218 and 220 of the 1–2 shift valve assembly. Thus each shift valve assembly is urged to its downshift position. If the vehicle speed at this time is lower than a predetermined value, a downshift will occur. Each shift valve assembly, of course, has its own governor pressure beyond which a downshift cannot be effected by the downshift valve 308.

This downshift valve assembly is unlike conventional downshift valve arrangements in automatic control valve circuits of known construction. It is conventional practice to employ a downshift valve that is in fluid communication with the regulated line pressure passage that would correspond to passage 164. When the downshift valve in such arrangements is actuated, communication between the shift valve assemblies and the exhaust regions is interrupted and communication between the shift valve assemblies and the main regulated line pressure passage is established. If at that time the engine speed is operating at a relatively high value, a large flow from the engine driven pump must be accommodated by the regulator valve assembly. It is difficult for the regulator valve assembly to maintain a constant regulated pressure as the flow increases from a low value to the maximum value. A slight increase in the regulated pressure level thus will occur as the engine speed increases. This is due in part to the dimensional tolerances of the regulator valve assembly and the pump itself. It has been found, therefore, that in such conventional arrangements the shift points cannot be established accurately upon a forced downshift. This is due to the fact that the signal that is distributed to the shift valve assembly by the downshift valve is not of a known value since it is variable and dependent in part upon engine speed. In my improved downshift valve assembly, however, the downshift valve element is supplied with regulated pressure—namely, primary throttle valve output pressure or, more accurately, throttle booster valve output pressure. The magnitude of this output pressure is independent of the engine speed. Thus the downshift points are established with more precision than they would be if the conventional downshift valve arrangement were employed.

The governor valve assembly for producing the road speed sensitive signal comprises a valve body having formed therein a primary governor valve chamber 326 and a secondary governor valve chamber 328. A primary governor valve element 330 is situated in chamber 326 and corresponding secondary governor valve element 332 is situated in chamber 328. Element 330 includes valve lands 334 and 336, which register with internal valve lands formed in the chamber 326. A primary governor valve spring 338 normally urges the valve element 330 radially inwardly. The radially outward region of chamber 326 is exhausted through an exhaust port 340.

The secondary governor valve element 332 includes valve lands 342 and 344, the latter being formed with a larger diameter than the former. The radially inward region of the chamber 328 is exhausted through an exhaust port 346.

Passage 194, which is pressurized during operation in the forward drive ranges, is in fluid communication with passage 348 which extends to the chamber 328 at a location directly adjacent land 342. The output pressure signal passage 234 communicates with the secondary valve chamber 328 at a location directly adjacent land 344. The radially outward end of land 342 is in fluid communication with the primary governor valve chamber 326 at a location intermediate lands 334 and 336, a suitable cross passage 350 being provided for this purpose. A spring 352 urges element 332 radially outwardly.

When pressure is distributed to passage 348, valve element 332 tends to move radially inwardly. This causes passage 234 to be brought into communication with exhaust port 346, and communication between passage 234 and passage 348 is interrupted. At the same time passage 348 is brought into communication with the radially outward end of the land 342. As the power output shaft for the transmission mechanism begins to rotate, a centrifugal force develops on the valve element 330 due to its mass and its operating radius. At a predetermined breakpoint speed, valve element 330 will move outwardly against the opposing force of spring 338 thereby exhausting passage 350 through exhaust port 340. This relieves the pressure on the radially outward end of land 342 so the secondary governor valve element begins to modulate and to produce a pressure signal in passage 234 that is related functionally in magnitude to the speed of rotation of the power output shaft.

To cushion the application of the direct drive clutch when a 2–3 upshift is made under minimum throttle conditions, there is provided a 2–3 backout valve. This has been described in the copending Leonard et al. application Ser. No. 277,855, and reference may be had thereto for the purpose of supplementing this disclosure. The backout valve includes a valve element 354 having spaced annular valve lands 356 and 358. These are slidably situated within a valve chamber 360 which is formed with internal valve lands that register with the lands 358 and 356. Valve element 354 is urged in an upward direction as viewed in FIGURE 2B by valve spring 362. The upper end of the chamber 360 is in fluid communication with the reverse and direct drive clutch through a passage 364. Passage 232 which was discussed with reference to the 1–2 shift valve assembly, communicates with the valve chamber 360 at a location intermediate lands 356 and 358. Passage 367, which extends to the apply side of the intermediate brake servo, communicates with the chamber 360 at a location directly adjacent land 358. When the element 354 assumes the position shown, valve chamber 360 establishes fluid communication between passages 232 and 367.

If an upshift from the intermediate speed ratio to the direct drive high speed ratio occurs under minimum throttle conditions, the 2–3 shift valve assembly will cause pressure to be distributed to passage 254 from passage 192 as the valve element 236 move downwardly from the position shown in FIGURE 2A. This will cause a pressure buildup in the reverse and direct drive servo. This pressure buildup is distributed also to the upper end of the land 358 through passage 364. At the same time the pressure buildup begins to occur on the offside of the intermediate brake servo as pressure is distributed from passage 252 to passage 366 through one-way check valve 365. The pressure in line 364 in direct drive from line 192 is the same as the pressure in line 232 in all forward drive ranges from line 194. At some predetermined point during the pressure buildup, spool 354 moves downwardly against the opposing influence of spring 362 thereby bringing passage 364 into fluid communication with passage 367, which extends to the apply side of the intermediate brake servo. The direct drive clutch will become locked up under these minimum throttle conditions at a very low pressure. The backout valve is designed to modify the servo capacity of the intermediate brake servo during the shift interval so that the end point or point at which the intermediate brake servo will become released will correspond to the point at which the direct drive clutch will become locked up. Under zero throttle conditions, these end points should coincide and no substantial degree of overlap should occur. On the other hand if a throttle pressure is present in passage 272, the transmission at that time is delivering torque although at a reduced magnitude. Under these conditions the shifting of the valve spool 354 in a downward direction will be delayed until the pressure in passage 364 and in the reverse and direct drive clutch will have reached a higher value. Thus the apply side of the intermediate brake servo is brought into fluid communication with the reverse and direct drive clutch at a later time during the shift interval. Finally, when a 2–3 shift occurs under intermediate or high torque conditions, the throttle pressure in passage 272 is sufficient to maintain the valve element 354 in an upward position until after the direct drive clutch becomes fully engaged and the intermediate servo becomes released. If it shifts thereafter, it has no influence upon the shift quality and has no function.

In order to make certain that the 2–3 backout valve will assume an upward position during manual low operation, a manual low valve 368 is provided. It is necessary that the valve element 354 be held in an upward position since it would be impossible to pressurize the apply side of the intermediate servo if passage 367 were in continuous fluid communication with passage 364. The latter, of course, is exhausted through the 2–3 shift valve assembly and passage 250. The passage 250 in turn communicates with exhausted passage 158. Thus the lower end of the manual low valve 368 is pressurized. As the manual valve is shifted to the L position, pressure is distributed to the manual low valve through passage 324.

As explained in the earlier part of this specification, it is necessary to reduce the magnitude of the regulated line pressure that is maintained by the main regulator valve after the speed ratio increases to an intermediate value. It is desirable that this occur at a time prior to the point at which an automatic upshift would occur. This cutback is accompanied by the cutback valve shown at 370 in FIGURE 2B. This valve includes a valve element 372 which is situated slidably within a valve chamber 374. Element 372 includes three spaced valve lands 376, 378 and 380. An exhaust port 382 communicates with the lower region of the chamber 374. The upper region of the chamber 374 is in fluid communication with governor pressure passage 234. Throttle pressure passage 272 communicates by means of a branch passage 384 with the chamber 374 at a location intermediate lands 376 and 380. The diameter of land 376 is greater than the diameter of land 380, so the pressure force due to the throttle pressure in passage 272 normally urges the cutback valve element 372 in an upward direction as viewed in FIGURE 2B. This force is opposed by the oppositely directed force due to the governor pressure in passage 234.

When the valve element 372 is positioned as shown, throttle pressure is distributed through chamber 374 from passage 272 to cutback pressure passage 386. On the other hand when the valve element 372 assumes a downward position, passage 386 is brought into fluid commmunication with exhaust port 382. The speed at which passage 386 becomes exhausted then depends in part upon the magnitude of the throttle pressure in passage 272. At advanced engine throttle settings, the cutback in pressure occurs at a higher vehicle speed following acceleration from a standing start.

As explained previously the cutback pressure is distributed from passage 386 to passage 154, which in turn communicates with the annular area defined by the differential diameter lands 150 and 152 of the pressure booster valve assembly. This same pressure is distributed through passage 156 to the intermediate band accumulator valve 388. This valve comprises a valve spool 390 having spaced lands 392 and 394. These lands are slidably situated within a valve chamber 396 which defines internal valve lands that register with the lands 392 and 394.

Valve spool 390 is biased in a downward direction, as viewed in FIGURE 2A, by a valve spring 398. The lower region of the chamber 396 is in fluid communication with passage 198 through a branch passage 400. Thus when the manual valve is shifted to the reverse drive position or to the low drive range position L, passage 400 becomes pressurized and valve spool 390 is urged in an upward direction against the opposing influence of spring 398 and is rendered ineffective. The accumulator valve 388 functions only when the passage 400 is exhausted.

Passage 366, which communicates with the release side of the intermediate brake servo, communicates with the valve chamber 396 at a location intermediate lands 392 and 394. Passage 252, which extends to the direct drive clutch, communicates with the chamber 396 at a location above land 394. Valve element 390 establishes communication between passages 366 and 252 when it shifts upwardly against the opposing inuuence of spring 398.

The force of spring 398 can be supplemented by a fluid pressure force that acts upon the upper end of a single diameter valve element 402 which is slidably situated within a sleeve 404 disposed in a large diameter portion of chamber 396. The passage 156 distributes pressure to the upper end of element 402 when the cutback pressure passage 154 is pressurized.

If we assume for the moment that passage 156 is exhausted and the transmission is conditioned for a 1–2 upshift during the acceleration period, the intermediate brake servo 50 will become pressurized due to distribution of pressure to passage 367. This causes the intermediate servo piston to stroke, and the fluid that exists on the release side of the intermediate brake servo is displaced through passage 366. The outlet for this fluid in passage 366 is temporarily blocked by the accumulator valve element 390. When the back pressure thus developed in passage 366 reaches a value of approximately 10 p.s.i., spring 398 yields thereby permitting the fluid in passage 366 and on the release side of the intermediate brake servo piston to become exhausted through passage 252 and hence through the 2–3 shift valve assembly to passage 250. It then is exhausted through the exhausted passage 158. This back pressure in the intermediate servo cushions the application of the intermediate brake band and thus softens the 1–2 shift. This substantially improves the shift quality.

As explained previously the cutback valve is shifted at a time prior to the 1–2 upshift during acceleration from a standing start. Thus the accumulator valve can be calibrated in such a way that it will function in the desired fashion with the pressure in passage 156 at a value of zero. The back pressure that is developed on the release side of the intermediate brake servo thus is a function only of the calibration of spring 398.

If we continue to assume that passage 156 is exhausted, the intermediate band accumulator valve will function in a similar fashion to cushion the application of the intermediate brake band during a 3–2 downshift. Under these conditions the direct drive clutch becomes released as passage 252 and passage 254 become exhausted through the 2–3 shift valve assembly. At the same time the fluid on the release side of the intermediate servo tends to accumulate as the intermediate servo piston begins to stroke. This again develops a back pressure in passage 366. When the back pressure reaches a value of approximately 10 p.s.i., the spring 398 yields thereby permitting the fluid on the release side of the intermediate servo to be exhausted through passage 252 just as it does during a 1–2 upshift.

When the 3–2 downshift is initiated at low vehicle speeds and with advanced engine throttle settings, it is possible for the cutback valve to assume the position shown in FIGURE 2B rather than the downward position. In a preferred embodiment of the invention, the cutback valve will move to the position shown under wide open throttle operating conditions whenever the vehicle speed is less than 30 m.p.h. If this is the case, of course, passage 154 and passage 156 will be pressurized. The magnitude of the regulated line pressure is boosted due to the action of the pressure booster valve as explained previously. Also, the spring force of spring 398 is augmented by the pressure force acting upon valve element 402. Thus when a 3–2 downshift occurs, the stroking of the intermediate servo piston creates a higher back pressure than it would otherwise.

In a preferred embodiment of my invention the back pressure produced in passage 266 upon a 3–2 downshift at low speeds and advanced throttle settings is approximately 30 p.s.i. This higher back pressure is necessary in order to produce the required cushioning action under such high torque delivery conditions. Of course, the total effective servo force due to the pressure differential in each of the two opposed fluid pressure chambers of the intermediate servo is much higher under these conditions than it would be under operation at reduced engine throttle settings notwithstanding the fact that the back pressure in passage 366 is higher. This is due to the augmentation in the regulated line pressure level due to the action of the pressure booster valve. It is aparent, therefore, that the calibration of the accumulator valve can be tailored so that it will satisfy the requirements of a 3–2 downshift under advanced throttle speed conditions without reference to the calibration that is necessary for a high quality 1–2 upshift. The accumulating action, of course, is apparent during each shift. However, the degree of accumulation can be modified to satisfy the peculiar requirements of each shift.

If a 3–2 downshift occurs at higher vehicle speeds at reduced throttle settings, the cutback valve will shift to the cutback position at a time prior to the 3–2 downshift. Under these conditions the accumulator valve functions in the same fashion as it does during a 1–2 upshift. A higher degree of accumulating action is not required under these circumstances.

Another desirable characteristic of the intermediate band accumulator valve is its automatic compensation for altitude changes when the vehicle is operated at sea level and the valve system is calibrated so that it will respond properly to a given primary throttle pressure. To produce the necessary shift points, the calibration will be inappropriate for corresponding operation at increased altitudes. The engine intake manifold pressure, of course, is sensitive to altitude changes. A greater engine throttle setting is required to produce a given manifold pressure at an increased altitude than the corresponding setting that would be required to produce that same pressure at sea level. The shift points are affected accordingly. The calibration of the intermediate band accumulator valve, however, is not affected by these changes in altitude since the same change in the throttle pressure that is sensed by the shift valve is sensed also by the valve element 402.

Primary throttle pressure is distributed through passage 272 in the line pressure coasting boost valve 406. This valve comprises a valve spool 408 having spaced valve lands 410 and 412. Spool 408 is biased in an upward direction, as viewed in FIGURE 2A, by valve spring 414. Passage 272 communicates with a passage 416 through the line pressure coasting boost valve chamber 418 within which the spool 408 is situated. Chamber 418 is formed with internal valve lands that cooperate with lands 412 and 410. Line pressure passage 164 communicates by means of a branch passage 420 with the chamber 418 at a location intermediate lands 410 and 412. Governor pressure from passage 234 is distributed to the upper end of chamber 418. It acts upon land 410 to produce a governor pressure force that opposes the influence of spring 414.

When the transmission mechanism is operated under torque, the throttle pressure in passage 272 is sufficient to maintain the valve spool 408 in the position shown in FIGURE 2A. If, however, the vehicle is coasting under zero or minimum throttle conditions and if the vehicle speed is greater than a predetermined value, valve spool 408 will be shifted in a downward direction thereby establishing fluid communication between line pressure passage 164 and passage 416 which in turn communicates with passage 160 described in the preceding part of the specification. This produces a boost in the magnitude of the regulated line pressure thereby making it possible for the clutch and brake servos to maintain capacity during coasting at high speeds. At lower speeds the governor pressure in passage 234 is insufficient to overcome the opposing influence of spring 414 regardless of whether any throttle pressure in passage 272 exists. Under these conditions the line pressure boost does not occur during coasting operation.

Referring next to FIGURE 4, I have shown a modified form of the intermediate band accumulator valve. In FIGURE 4 the valve assembly itself can be formed in an identical fashion. Passage 400 of FIGURE 2A, however, is replaced in FIGURE 4 by a passage 422 which communicates with passage 222 of the 1–2 shift valve assembly. It thus will be apparent that on a 1–2 upshift or a 3–2 downshift, the calibration of the accumulator valve will be dependent upon the magnitude of the modulated T. V. pressure in passage 422 as well as upon the calibration of the valve spring 398′. Each of the elements of the valve assembly of FIGURE 4 have been identified with reference characters that are identical with the corresponding reference characters of FIGURE 2A although primed notations have been added.

If a 1–2 upshift occurs when the magnitude of the primary throttle valve pressure is insufficient to shift the throttle modulator valve, the pressure in passage 422 will be zero and the valves of FIGURE 4 will then function in the same fashion as the corresponding valves of FIGURE 2A. If a 1–2 shift occurs with an advanced engine throttle setting, however, the magnitude of the throttle pressure that is developed will be sufficient to produce a modulated throttle pressure in passage 222 and in passage 422 and the accumulating action of the accumulator valve will be modified accordingly as a shift occurs. With increasing engine throttle settings, the accumulating action washes out and at some value at which passages 366 and 252 are brought into fluid communication, the accumulating action is zero. Thus the effective back pressure that is developed as the intermediate servo piston strokes can be any value between zero and 10 p.s.i. on a 1–2 upshift with advanced engine throttle settings. This introduces another variable that can be adjusted to further improve the shift quality on a 1–2 upshift.

The same influence of modulated throttle pressure in passage 422 can be made effective also upon the 3–2 downshift. Thus the pressure in passage 422 on a 3–2 downshift opposes the influence of spring 398′. As explained previously, if a 3–2 downshift occurs at an advanced engine throttle setting and at reduced speed, the cutback valve will have caused the valve element 402 to become pressurized. This normally would tend to produce a back pressure of a magnitude of about 30 p.s.i. But the magnitude of this back pressure is reduced as the throttle pressure in passage 422 increases. Thus the effective back pressure can be any value between zero and 30 p.s.i. This, as in the case of the 1–2 upshift provides another variable that can be used to more precisely tailor the shift points to produce any desired shift quality.

Having thus described preferred embodiments of my invention, what I claim and desire to secure by U.S. Letters Patent is:

1. In an automatic power transmission mechanism for delivering torque from a driving member to a driven member with multiple speed ratios, torque transmitting gear elements adapted to establish plural torque delivery paths between said driving member and said driven member, fluid pressure operated servos for controlling the relative motion of said gear elements to initiate speed ratio changes, a fluid pressure source, a regulator valve assembly for maintaining a regulated pressure level at said source, conduit structure interconnecting said source and said servos including a manual valve shiftable to a first position to condition said mechanism for two automatic speed ratio changes to higher speed ratios and shiftable to a second position to condition said mechanism for one speed ratio change to one higher speed ratio, a pair of shift valves disposed in and partly defining said conduit structure, one shift valve establishing in part a fluid flow path from said manual valve to one servo to control distribution of pressure to said one servo, the other shift valve defining a fluid flow path between said manual valve and another servo, said other shift valve being formed in two parts, said manual valve distributing pressure to one path when it assumes one said position and to the other path when it assumes the other position, and an auxiliary passage interconnecting said manual valve and said other shift valve, said auxiliary passage being pressurized upon simultaneous pressurization of each path thereby causing said other shift valve to assume a flow path blocking position.

2. In an automatic power transmission mechanism for delivering torque from a driving member to a driven member with multiple speed ratios, torque transmitting gear elements adapted to establish plural torque delivery paths between said driving member and said driven member, fluid pressure operated servos for controlling the relative motion of said gear elements to initiate speed ratio changes, a fluid pressure source, a regulator valve assembly for maintaining a regulated pressure level at said source, conduit structure interconnecting said source and said servos including a manual valve shiftable to a first position to condition said mechanism for two automatic speed ratio changes to higher speed ratios and shiftable to a second position to condition said mechanism for one speed ratio change to one higher speed ratio, a pair of shift valves disposed in and partly defining said conduit structure, one shift valve establishing in part a fluid flow path from said manual valve to one servo to control distribution of pressure to said one servo, the other shift valve defining a fluid flow path between said manual valve and another servo, said other shift valve being formed in two parts, said manual valve distributing pressure to one path when it assumes said one position and to the other path when it assumes the other position, an auxiliary passage interconnecting said manual valve and said other shift valve, said auxiliary passage being pressurized upon simultaneous pressurization of each path thereby causing said other shift valve to assume a flow path blocking position, a source of a pressure signal that is proportional in magnitude to driving torque delivered through said gear elements, a source of a pressure signal that is proportional in magnitude to the driven speed of said driven member, and passage means for conducting each signal to separate portions of each shift valve to initiate automatic speed ratio changes in response to variations in the magnitude of said signals.

3. In a power transmission control system for use in a transmission mechanism adapted to deliver torque from an internal combustion vehicle engine to a driven member, said engine having an air-fuel mixture intake manifold system, a source of fluid pressure in the form of a pump driven by said engine, relatively rotatable gear elements forming torque delivery paths from said engine to said driven member, fluid pressure operated servos in the form of clutches and brakes for controlling the relative motion of said gear elements to establish speed ratio changes, conduit structure interconnecting said servos and said pump, a main regulator valve assembly communicating with said conduit structure and adapted to maintain a regulated pressure level in said conduit structure, manual valve means in said conduit structure for distributing selectively fluid pressure from said pump to separate regions of said system, a first shift valve means in one region for distributing selectively pressure from said manual valve to one servo, a second shift valve means in another region of said circuit for distributing pressure from said manual valve to another servo, said other shift valve means being bipartite in form, an auxiliary passage extending from said other shift valve means, said auxiliary passage being pressurized when said manual valve assumes said first position thereby distributing a pressure to said second shaft valve means that causes it to assume a high speed ratio position thereby overruling its automatic upshifting and downshifting tendencies, a pressure signal that is proportional in magnitude to the driven speed of said driven member, passage means for distributing said signal to each of said shift valve means, one part of said bipartite valve element being subjected to said pressure signal and a separate and independently movable part of said valve element being shiftable in response to a pressure buildup in said auxiliary passage means for conditioning said mechanism for operation in a speed ratio that is higher than the lowest speed ratio that is available.

4. In a power transmission control system for use in a transmission mechanism adapted to deliver torque from an internal combustion vehicle engine to a driven member, said engine having an air-fuel mixture intake manifold system, a source of fluid pressure in the form of a pump driven by said engine, relatively rotatable gear elements forming torque delivery paths from said engine to said driven member, fluid pressure operated servos in the form of clutches and brakes for controlling the relative motion of said gear elements to establish speed ratio changes, conduit structure interconnecting said servos and said pump, a main regulator valve assembly communicating with said conduit structure and adapted to maintain a regulated pressure level in said conduit structure, manual valve means in said conduit structure for distributing selectively fluid pressure from said pump to separate regions of said system, a first shift valve means in one region for distributing selectively pressure from said manual valve to one servo, a second shift valve means in another region of said circuit for distributing pressure from said manual valve to another servo, said other shift valve means being bipartite in form, an auxiliary passage extending from said other shift valve means, said auxiliary passage being pressurized when said manual valve assumes said first position thereby distributing a pressure to said second shift valve means that causes it to assume a high speed ratio position thereby overruling its automatic upshifting and downshifting tendencies, a pressure signal that is proportional in magnitude to the driven speed of said driven member, passage means for distributing said signal to each of said shift valve means, one part of said bipartite valve element being subjected to said pressure signal and a separate and independently movable part of said valve element being shiftable in response to a pressure buildup in said auxiliary passage means for conditioning said mechanism for operation in a higher speed ratio, and a source of a pressure signal that is proportional in magnitude to the manifold pressure in said intake manifold system, said pressure source being in fluid communication with each of said shift valve means to establish thereon a valve actuating force that opposes the influence of said first signal, said vacuum pressure signal acting upon said bipartite valve element.

5. In a power transmission control system for use in a transmission mechanism adapted to deliver torque from an internal combustion vehicle engine to a driven member, said engine having an air-fuel mixture intake manifold system, a source of fluid pressure in the form of a pump driven by said engine, relatively rotatable gear elements forming torque delivery paths from said engine to said driven member, fluid pressure operated servos in the form of clutches and brakes for controlling the relative motion of said gear elements to establish speed ratio changes, conduit structure interconnecting said servos and said pump, a main regulator valve assembly communicating with said conduit structure and adapted to maintain a regulated pressure level in said conduit structure, manual valve means in said conduit structure for distributing selectively fluid pressure from said pump to separate regions of said system, a first shift valve means in one region for distributing selectively pressure from said manual valve to one servo, a second shaft valve means in another region of said circuit for distributing pressure from said manual valve to another servo, an auxiilary passage extending from said other shift valve means, said auxiliary passage being pressurized when said manual valve assumes said first position thereby distributing a pressure to said second shift valve means that causes it to assume a high speed ratio position thereby overruling its automatic upshifting and downshifting tendencies, a pressure signal that is proportional in magnitude to the driven speed of said driven member, passage means for distributing said signal to each of said shift valve means, said other shift valve means being subjected to said pressure signal and being shiftable in response to a pressure buildup in said auxiliary passage means for conditioning said mechanism for operation in a higher speed ratio, and a source of a pressure signal that is proportional in magnitude to the manifold pressure in said intake manifold system, said pressure source being in fluid communication with each of said shift valve means to establish thereon a valve actuating force that opposes the influence of said first signal, said vacuum pressure signal acting upon said other shift valve means.

6. In an automatic power transmission mechanism for delivering torque from a driving member to a driven member with multiple speed ratios, torque transmitting gear elements adapted to establish plural torque delivery paths between said driving member and said driven member, fluid pressure operated servos for controlling the relative motion of said gear elements to initiate speed ratio changes, a fluid pressure source, a regulator valve assembly for maintaining a regulated pressure level at said source, conduit structure interconnecting said source and said servos including a manual valve shiftable to a first position to condition said mechanism for two automatic speed ratio changes to higher speed ratos and shiftable to a second position to condition said mechanism for one speed ratio change to one higher speed ratio, a pair of shift valves dipsosed in and partly defining said conduit structure, one shift valve establishing in part a fluid flow path from said manual valve to one servo to control distribution of pressure to said one servo, the other shift valve defining a fluid flow path between said manual valve and another servo, said manual valve distributing pressure to one path when its assumes said one position and to the other path when its assumes the other position, and an auxiliary passage interconnecting said manual valve and said other shift valve, said auxiliary passage being pressurized upon simultaneous pressurization of each path thereby causing said other shift valve to assume a flow path blocking position.

References Cited
UNITED STATES PATENTS

| | | | |
|---|---|---|---|
| 3,000,230 | 9/1961 | Froslie | 74—869 |
| 3,004,446 | 10/1961 | Flinn | 74—869 |
| 3,095,755 | 7/1963 | Duffy | 74—869 X |
| 3,295,387 | 1/1967 | Leonard et al. | 74—864 |

ARTHUR T. McKEON, *Primary Examiner.*